US008820994B2

(12) United States Patent
Krier (10) Patent No.: US 8,820,994 B2
(45) Date of Patent: Sep. 2, 2014

(54) VEHICLE INDICATOR DISPLAY, AND METHOD OF FORMING

(75) Inventor: James Frederick Krier, Grosse Point Woods, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 379 days.

(21) Appl. No.: 13/193,467

(22) Filed: Jul. 28, 2011

(65) Prior Publication Data

US 2013/0027953 A1    Jan. 31, 2013

(51) Int. Cl.
*F21V 11/16*    (2006.01)
*F21V 11/08*    (2006.01)
*F21S 8/10*    (2006.01)
*F21V 9/00*    (2006.01)
*B60K 35/00*    (2006.01)

(52) U.S. Cl.
CPC ............... B60K 35/00 (2013.01); F21V 11/08 (2013.01); F21S 8/10 (2013.01); F21V 9/00 (2013.01); *B60K 2350/203* (2013.01)
USPC ........ 362/544; 362/545; 362/248; 362/23.17; 40/573; 40/579; 40/581

(58) Field of Classification Search
USPC .......... 362/23.08, 23.1, 23.17, 612, 613, 489, 362/511, 543, 544, 545, 231, 245, 248, 362/491; 40/573, 579, 581; 200/310, 311, 200/317
See application file for complete search history.

(56) References Cited

U.S. PATENT DOCUMENTS

| 1,890,893 | A | * | 12/1932 | Andres | 40/573 |
|---|---|---|---|---|---|
| 2,597,584 | A | * | 5/1952 | Hopkins | 340/470 |
| 3,608,222 | A | * | 9/1971 | Koch | 40/452 |
| 4,688,156 | A | * | 8/1987 | Suzuki et al. | 362/354 |
| 4,772,096 | A | * | 9/1988 | Kai et al. | 359/601 |
| 5,142,415 | A | * | 8/1992 | Koehnle | 359/601 |
| 5,252,798 | A | * | 10/1993 | Kamada | 200/314 |
| 5,254,388 | A | * | 10/1993 | Melby et al. | 428/120 |
| 5,975,728 | A | * | 11/1999 | Weyer | 362/489 |
| 6,400,506 | B1 | | 6/2002 | Monson et al. | |
| 6,508,578 | B2 | * | 1/2003 | Yoda et al. | 362/545 |
| 6,994,448 | B1 | * | 2/2006 | Gorrell | 362/183 |
| 7,042,610 | B1 | | 5/2006 | Berman | |
| 7,246,911 | B2 | | 7/2007 | Fong | |
| 7,508,571 | B2 | | 3/2009 | Gally et al. | |
| 7,534,000 | B1 | | 5/2009 | Adachi et al. | |
| 7,674,845 | B2 | | 3/2010 | Van Duijnhoven et al. | |

(Continued)

OTHER PUBLICATIONS

DSM Engineering Plastics; DSM Guide, General Information on Laser Marking of DSM Engineering Plastics, 2008; http://www.dsm.com/en_US/downloads/dep/LaserMarking_02.pdf.

*Primary Examiner* — Ismael Negron
(74) *Attorney, Agent, or Firm* — Klintworth & Rozenblat IP LLC (57) ABSTRACT

A lighting apparatus includes a light-transmitting member, a first light source, a second light source, and at least one laser-formed light-reducing baffle. The light-transmitting member is for transmitting light within the light-transmitting member. The first light source is for emitting a first light into the light-transmitting member. The second light source is for emitting a second light into the light-transmitting member. The at least one laser-formed light-reducing baffle is disposed in the light-transmitting member for reducing transmission of the first and second lights within the light-transmitting member.

23 Claims, 4 Drawing Sheets

(56) References Cited

U.S. PATENT DOCUMENTS

| | | |
|---|---|---|
| 7,898,531 B2 | 3/2011 | Bowden et al. |
| 8,068,278 B2 * | 11/2011 | Janson et al. ............... 359/472 |
| 8,248,265 B2 * | 8/2012 | Jones ...................... 340/815.4 |
| 2007/0035959 A1 | 2/2007 | Pala et al. |
| 2007/0273977 A1 | 11/2007 | Nemoto et al. |
| 2009/0073087 A1 | 3/2009 | Janson et al. |
| 2010/0112317 A1 | 5/2010 | Gasworth et al. |

* cited by examiner

VEHICLE INDICATOR DISPLAY, AND METHOD OF FORMING

FIELD OF THE DISCLOSURE

The disclosure relates to a laser-formed light-reducing baffle disposed in a light-transmitting member.

BACKGROUND OF THE DISCLOSURE

Telltale indicators for automotive control panels indicate the state of a graphic display such as a switch function. Current technology typically utilizes a separate light jewel that protrudes through the panel for the telltale indicator. This construction often isn't perfectly flush and may show margin gaps. It is desirable aesthetically to provide a telltale indicator which has a seamless, flush appearance. However, most current flush telltales are not effective at preventing light-leaks when the telltale indictor is close to the switch light-source due to the unwanted optical coupling inherent in the construction of these panels. Solutions that reduce the optical coupling inherent in the construction of these panels typically utilize a two shot, light-reducing construction whereby a light-reducing material is molded behind a clear resin to attenuate some of the light transmission. The light-reducing material typically has opaque properties. However, the two shot construction method only partially reduces the light-leaks through absorption often leaving an unintended clear material light-guide. The two shot construction also often has cosmetic defects at the boundaries between the resins.

A lighting apparatus, and method for its manufacture, is needed which overcomes one or more issues of the current lighting systems.

SUMMARY OF THE DISCLOSURE

In one embodiment, a lighting apparatus comprises a light-transmitting member, a first light source, a second light source, and at least one laser-formed light-reducing baffle. The light-transmitting member is for transmitting light within the light-transmitting member. The first light source is for emitting a first light into the light-transmitting member. The second light source is for emitting a second light into the light-transmitting member. The at least one laser-formed light-reducing baffle is disposed in the light-transmitting member for reducing transmission of the first and second lights within the light-transmitting member.

In another embodiment, a vehicle lighting apparatus comprises a light-transmitting member, a first light source, and at least one laser-formed light-reducing baffle. The light-transmitting member is for transmitting light within the light-transmitting member. The first light source is for emitting a first light into the light-transmitting member. The at least one laser-formed light-reducing baffle is disposed in the light-transmitting member for reducing transmission of the first light within the light-transmitting member.

In yet another embodiment, a method of manufacturing a vehicle lighting apparatus is provided. In one step, at least one light-reducing baffle is laser-formed in a light-transmitting member of a vehicle lighting apparatus. In another step, a first light source is disposed in a position to transmit a first light into the light-transmitting member of the vehicle lighting apparatus along the at least one laser-formed light-reducing baffle within the light-transmitting member.

These and other features, aspects and advantages of the disclosure will become better understood with reference to the following drawings, description and claims.

DETAILED DESCRIPTION OF THE DISCLOSURE

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims. It is noted that the Figures are purely for illustrative purposes and are not to scale.

Figure 1:
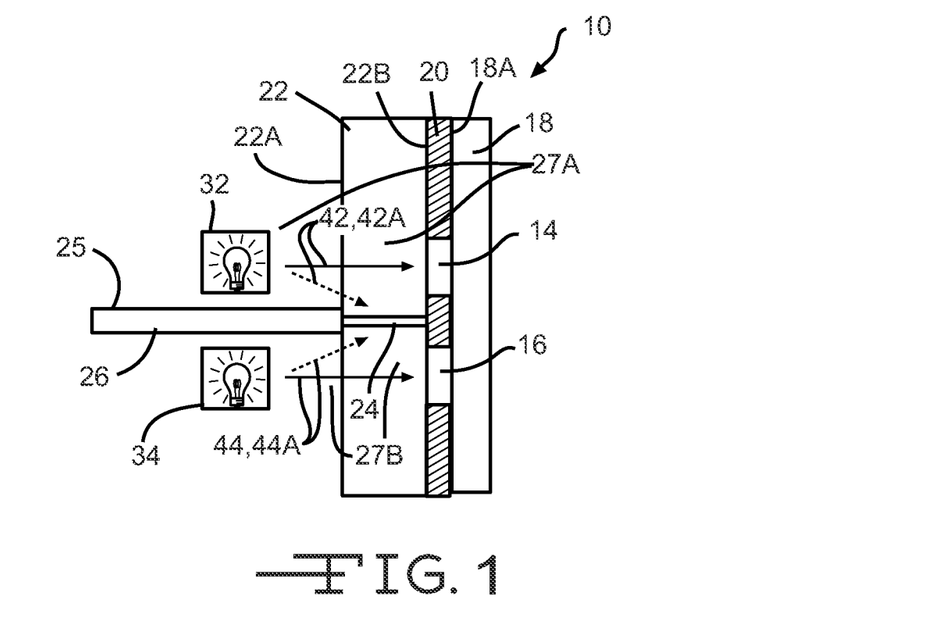
FIG. 1 illustrates a cross-sectional view through one embodiment of a lighting apparatus.

FIG. 1 illustrates a cross-sectional view through one embodiment of a lighting apparatus 10. The lighting apparatus 10 may comprise a telltale indicator of a vehicle. The term 'vehicle' is defined as a device or structure for transporting people or things. In other embodiments, the lighting apparatus 10 may be used as a lighting mechanism in various types of structures. The lighting apparatus 10 comprises a first display 14, a second display 16, a first layer 18, a second layer 20, a third layer 22, a first baffle 24, a second baffle 26, a first light source 32, and a second light source 34. The term 'baffle' throughout this disclosure is defined as a partition. The first layer 18 comprises a light-transmitting member for transmitting light within the light-transmitting member. The term 'light-transmitting' throughout this disclosure is defined as the property of being transparent or translucent to allow light to propagate from one place to another. The first layer 18 comprises a film made of polycarbonate. In other embodiments, the first layer 18 may comprise a variety of light-transmitting members made of varying materials. The second layer 20 comprises a light-reducing medium comprising a light-reducing ink made of pigments and resins. The term 'light-reducing' throughout this disclosure is defined as the property of reducing the transmission of light through an optical medium. In one embodiment, the term 'light-reducing' may refer to the light transmitting through an optical medium being reduced in a range of 20 to 100%. In another embodiment, the term 'light-reducing' may refer to the light transmitting through an optical medium being reduced in a range of 50 to 100%. In another embodiment, the term 'light-reducing' may refer to the light transmitting through an optical medium being reduced in a range of 75 to 100%. In another embodiment, the term 'light-reducing' may refer to the light transmitting through an optical medium being reduced by 100%. In other embodiments, the term 'light-reducing' may refer to the light transmitting through an optical medium being reduced in varying amounts. The light-reducing medium of the second layer 20 is printed on a back-surface 18A of the first layer 18. In other embodiments, the second layer 20 may be made of a wide variety of light-reducing materials which may be attached to either of the first or third layers 18 and 22 using varying manufacturing methods.

The first display 14 comprises an area between the first and third layers 18 and 22 where the light-reducing medium of the second layer 20 is not entirely disposed to allow light to transmit through the portions of the first display 14 where the light-reducing medium is not disposed. The first display 14 may be formed in any quantity, shape, configuration, or size to light any type of shape, symbol, wording, number, or other type of display. In one embodiment, the first display 14 may comprise a graphic display comprising at least one symbol indicating a function the graphic display turns on and off. For instance, the first display 14 may comprise the wording 'A/C' indicating that when a user touches a surface aligned with the 'A/C' wording the air-conditioning function of the vehicle will turn on or off due to a capacitive tough system.

The second display 16 comprises an area between the first and third layers 18 and 22 where the light-reducing medium of the second layer 20 is not entirely disposed to allow light to transmit through the portions of the second display 16 where the light-reducing medium is not disposed. The second display 16 may be formed in any quantity, shape, configuration, or size to light any type of shape, symbol, wording, number, or other type of display. In one embodiment, the second display 16 may comprise a telltale indicator, in the shape of a rectangle, indicating whether the function is turned on or off. In one embodiment, when the second display 16 is lit it indicates that the air-conditioning function is turned on, and when the second display 16 is not lit it indicates that the air-conditioning function is turned off. In one embodiment, when a user touches the 'A/C' symbol of the first display 14 to turn on the air-conditioning, the second display 16 will light up to indicate that the air-conditioning has been turned on. When the user touches the 'A/C' symbol 18 of the first display 14 again to turn off the air-conditioning, the second display 16 will no longer be lit indicating that the air-conditioning has been turned off. In other embodiments, the first display 14 and second display 16 may vary in what they display and indicate. Because the first display 14 and the second display 16 are disposed within the second layer 20, neither the first display 14 nor the second display 16 protrude outside of the first layer 18 providing for a perfectly flush, linear, aesthetically-pleasing exterior first layer 18 disposed in one plane at locations over the first 14 and second displays 16.

The third layer 22 comprises a light-transmitting member for transmitting light within the third layer 22. The third layer 22 comprises an injection molded clear plastic made of polycarbonate. In other embodiments, the third layer 22 may comprise a variety of light-transmitting members made of varying materials. After the second layer 20 is printed on the first layer 18, the first layer 18 is placed into a molding tool with the printed second layer 20 being disposed against transparent or translucent resin. The third layer 22 is then molded out of the transparent or translucent resin so that it is attached to the second layer 20 printed on the back-surface 18A of the first layer 18. In other embodiments, the first, second, and third layers 18, 20, and 22 may be formed or attached to one another using varying manufacturing methods.

The first baffle 24 comprises a laser-formed light-reducing baffle disposed through the third layer 22 extending from a back-surface 22A to a front-surface 22B of the third layer 22 against the second layer 20 in-between the first and second displays 14 and 16. The first baffle 24 is linear and is disposed between the first and second light sources 32 and 34. In other embodiments, the first baffle 24 may be in varying numbers, types, shapes, sizes, configurations, locations, or orientations. For instance, in another embodiment the first baffle 24 may comprise separate light-reducing baffles with each surrounding a perimeter of a separate one of the first and second displays 14 and 16. The first baffle 24 is formed in one-shot by shooting the third layer 22 with a laser to darken and alter the properties of the materials of the third layer 22 from transparent or translucent to light-reducing for absorbing light. The first baffle 24 may be formed using varying types of lasers, using varying parameters for the laser wavelength, power, frequency, laser spot size, laser marking speed, laser line distance, total time, and for other laser parameters. One or more additives may be added to the third layer 22 to assist in laser forming the first baffle 24. In other embodiments, the first baffle 24 may be manufactured in varying ways. In another embodiment, the first baffle 24 may comprise a plurality of baffles which are combined to reduce light from transmitting.

The second baffle 26 comprises a light-reducing baffle made of Acrylonitrile Butadiene Styrene (ABS) which is assembled behind the third layer 22. In other embodiments, the second baffle 26 may be made of varying light-reducing materials which may be manufactured and attached to the third layer 22 using a variety of manufacturing processes. The second baffle 26 extends linearly from a location 25 disposed apart from the third layer 22, between the first and second light sources 32 and 34, to and against the first baffle 24 at the back-surface 22A of the third layer 22. In other embodiments, the second baffle 26 may be in varying numbers, types, shapes, sizes, configurations, locations, orientations, or materials. For instance, in another embodiment the second baffle 26 may comprise separate light-reducing baffles with each surrounding a perimeter of a separate one of the first and second displays 14 and 16. In still another embodiment, the second baffle 26 may comprise a plurality of baffles which are combined to reduce light from transmitting. The first and second baffles 24 and 26 are aligned against one another to form a continuous light-reducing baffle extending from the location 25 disposed apart from the third layer 22, between the first and second light sources 32 and 34, from the back-surface 22A of the third layer 22 to the front surface 22B of the third layer 22, against the second layer 20 in between the first and second displays 14 and 16.

The first light source 32 emits a first light 42 for lighting up the first display 14. The second light source 34 emits a second light 44 for lighting up the second display 16. The first and second light sources 32 and 34 emit differently colored first and second lights 42 and 44 to light up the first and second displays 14 and 16 in different colors. In other embodiments, the first and second light sources 32 and 34 may emit first and second lights 42 and 44 having varying properties.

The first and second baffles 24 and 26 form first and second pathways 42A and 44A on opposite sides 27A and 27B of the first and second baffles 24 and 26. The first light 42 emitted from the first light source 32 follows the first pathway 42A from the first light source 32, along the first and second baffles 24 and 26, through the third layer 22, and lights up the first display 14 disposed within the second layer 20. The lit-up first display 14 is visible through the first layer 18. Similarly, the second light 44 emitted from the second light source 34 follows the second pathway 44A from the second light source 34, along the first and second baffles 24 and 26, through the third layer 22, and lights up the second display 16 disposed within the second layer 20. The lit-up second display 16 is visible through the first layer 18. The light-reducing first and second baffles 24 and 26 substantially prevent the first and second lights 42 and 44 emitted from the first and second light sources 32 and 34 from combining with each other. In such manner, the first and second displays 14 and 16 are lit-up in the respective colors of the first and second lights 42 and 44 emitted from the first and second light sources 32 and 34 without interference. Moreover, the linear first layer 18 provides a flush, aesthetically-pleasing appearance. In further embodiments, any of the components of the lighting apparatus 10 discussed herein may be removed, modified in shape, size, configuration, location, quantity, or orientation, or one or more additional components may be added.

Figure 2:
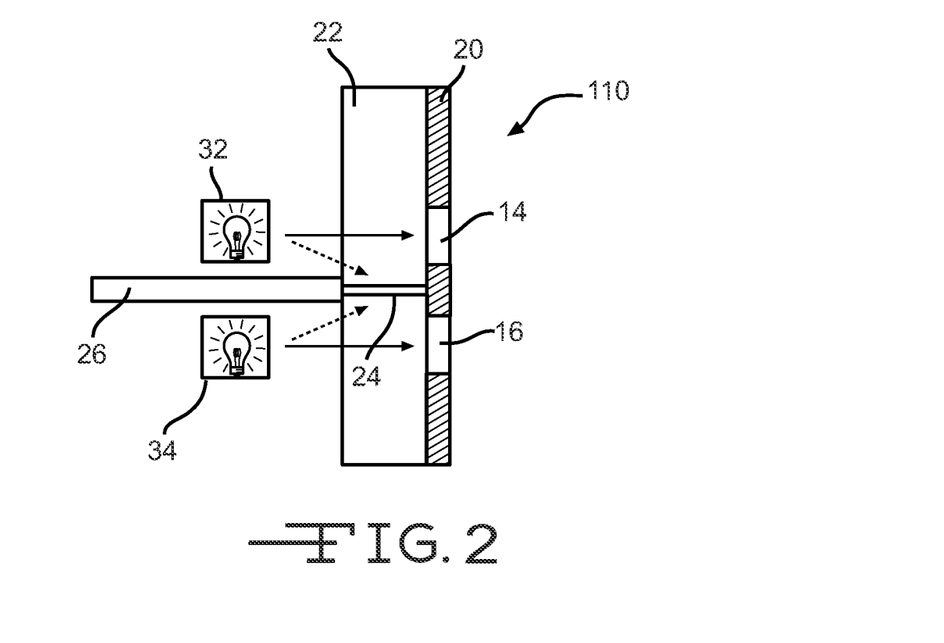
FIG. 2 illustrates a cross-sectional view through another embodiment of a lighting apparatus.

FIG. 2 illustrates a cross-sectional view through another embodiment of a lighting apparatus 110. The lighting apparatus 110 comprises the exact same components 14, 16, 20, 22, 24, 26, 32, 34, of the lighting apparatus 110 of FIG. 1 disclosed above with the exception that the first layer 18 is not present. The first display 14 and the second display 16 are disposed within the second layer 20 without protruding outside of the second layer 20 providing for a perfectly flush, linear, aesthetically-pleasing, exterior second layer 20 disposed in one plane at locations over the first and second displays 14 and 16. The only other difference in the lighting apparatus 110 of FIG. 2 in comparison to the lighting apparatus 10 of FIG. 1, as disclosed above, is how the lighting apparatus 110 is manufactured. To manufacture the lighting apparatus 110, the second layer 20 comprising the light-reducing medium may be painted or sprayed onto the third layer 22. Portions of the second layer 20 may then be etched or laser-removed from the third layer 22 to form the first and second displays 14 and 16 where the light-reducing medium of the second layer 20 is not entirely disposed against the third layer 22. In another embodiment, the light-reducing medium of the second layer 20 may be applied to the third layer 22 during molding of the third layer 22 using an in-mold decorative transfer method. The light-reducing medium of the second layer 20 may be applied to the third layer 22 to form the first and second displays 14 and 16 where the light-reducing medium of the second layer 20 is not entirely disposed. In further embodiments, any of the components of the lighting apparatus 110 discussed herein may be removed, modified in shape, size, configuration, location, quantity, or orientation, or one or more additional components may be added.

Figure 3:
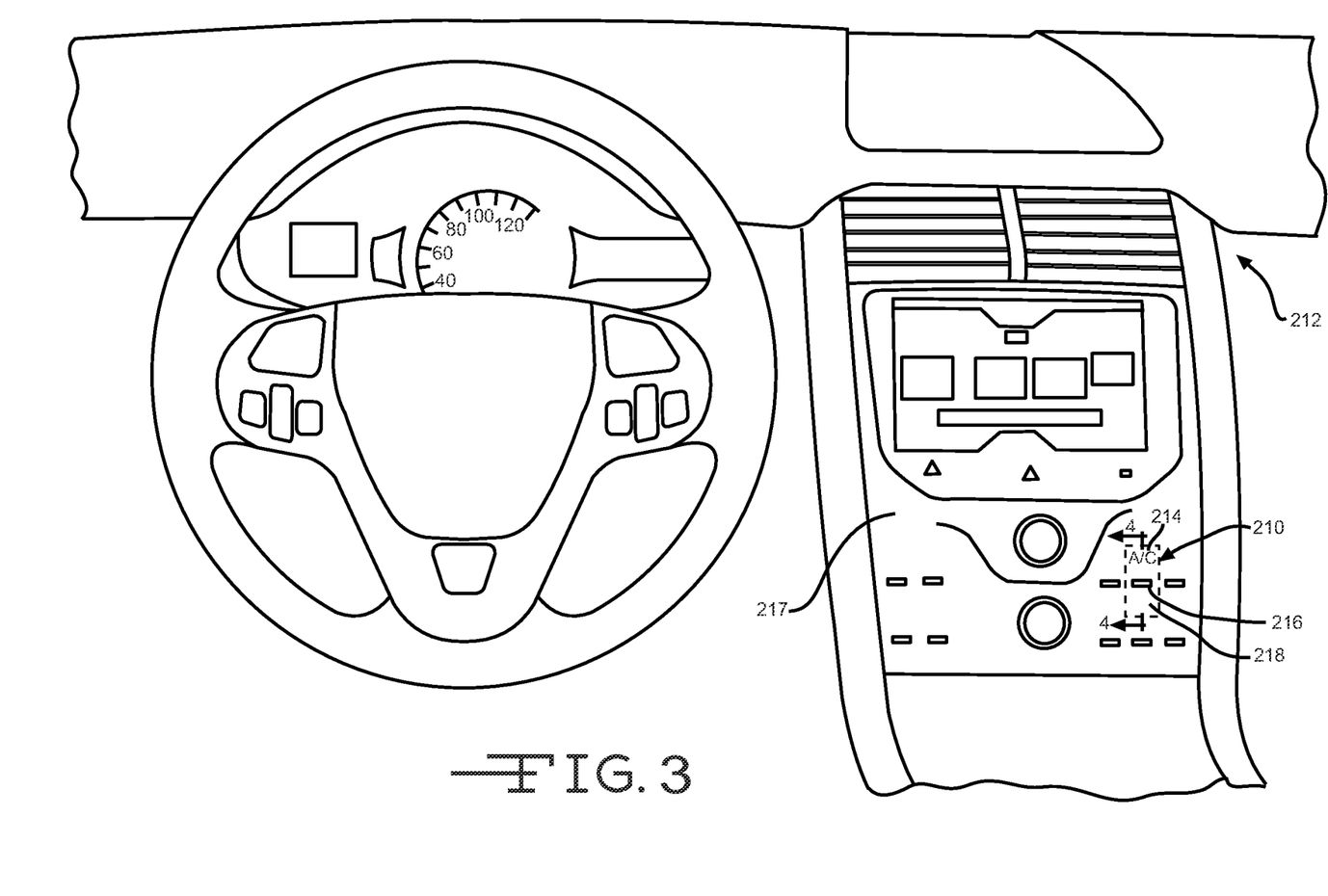
FIG. 3 illustrates a front view of another embodiment of a lighting apparatus of a vehicle.

FIG. 3 illustrates a front view of another embodiment of a lighting apparatus 210 of a vehicle 212. The lighting apparatus 210 includes a first display 214 and a second display 216 in a center-backlit-control-panel-console 217 of the vehicle 212. In the embodiment depicted, the first display 214 comprises a graphic display comprising at least one symbol indicating a function the graphic display turns on and off. The at least one symbol specifies 'A/C' which indicates that when a user touches the 'A/C' symbol that the air-conditioning function of the vehicle 212 will turn on or off due to a capacitive touch system. The second display 216 comprises a telltale indicator comprising a lighting display, in the shape of a rectangle, indicating whether the function is turned on or off. When the second display 216 is lit it indicates that the air-conditioning function is turned on, and when the second display 216 is not lit it indicates that the air-conditioning function is turned off. When a user touches the 'A/C' symbol of the first display 214 to turn on the air-conditioning, the second display 216 will light up to indicate that the air-conditioning has been turned on. When the user touches the 'A/C' symbol of the first display 214 again to turn off the air-conditioning, the second display 216 will no longer be lit indicating that the air-conditioning has been turned off. In other embodiments, the first display 214 and second display 216 may vary in what they display and indicate. The first display 214 and the second display 216 are embedded within an inner layer (not shown) of the console with the exterior first layer 218 being perfectly flush, linear, and disposed in one plane at locations over the first and second displays 214 and 216 in order to provide an aesthetically-pleasing appearance.

Figure 4:
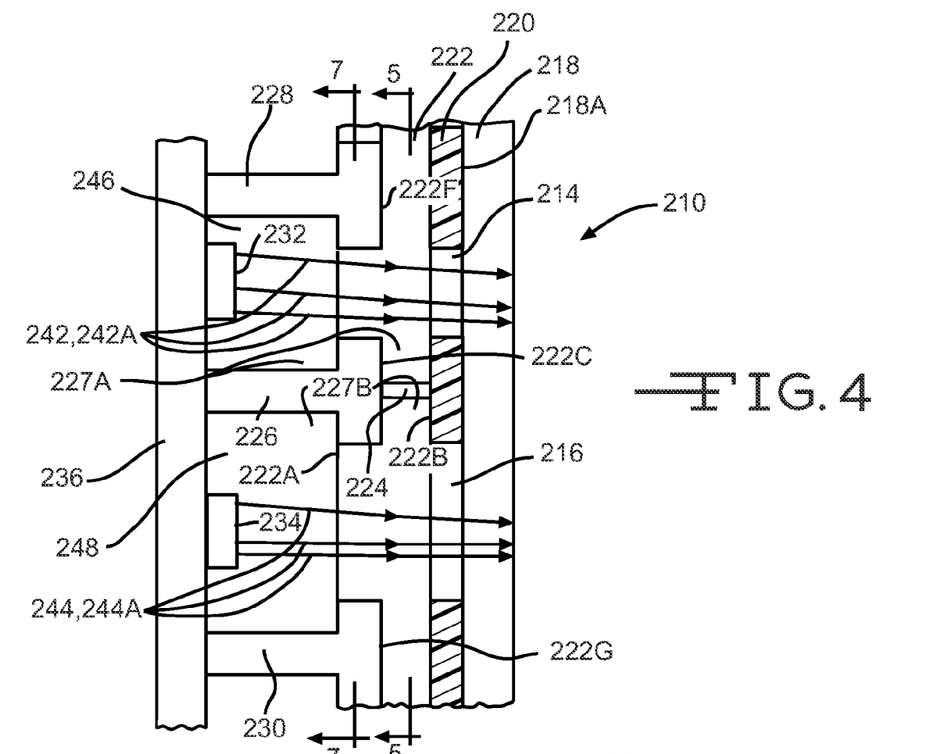
FIG. 4 illustrates a cross-sectional view through line 4-4 of the lighting apparatus of the embodiment of FIG. 3.

FIG. 4 illustrates a cross-sectional view through line 4-4 of the lighting apparatus 210 of the embodiment of FIG. 3. As shown in FIG. 4, the lighting apparatus 210 comprises the first display 214, the second display 216, a first layer 218, a second layer 220, a third layer 222, a first baffle 224, a second baffle 226, a third baffle 228, a fourth baffle 230, a first light source 232, a second light source 234, and a circuit board 236. The first layer 218 comprises a light-transmitting member for transmitting light within the light-transmitting member. The first layer 218 comprises a film made of polycarbonate. In other embodiments, the first layer 218 may comprise a variety of light-transmitting members made of varying materials. The second layer 220 comprises a light-reducing medium comprising a light-reducing ink made of pigments and resins. The second layer 220 is printed on a back-surface 218A of the first layer 218. In other embodiments, the second layer 220 may be made of a wide variety of light-reducing materials which may be attached to either of the first or third layers 218 and 222 using varying manufacturing methods such as painting and etching (such as laser etching), painting and laser-removing, an in-mold decorating ink transfer method, or using varying manufacturing processes such as film insert molding.

The first display 214 comprises an area between the first and third layers 218 and 222 where the light-reducing medium of the second layer 220 is not entirely disposed to allow light to transmit through the portions of the first display 214 where the light-reducing medium is not disposed. Although in this embodiment the first display 214 comprises a graphic display comprising at least one symbol indicating a function the graphic display turns on and off, in other embodiments the first display 214 may be formed in any quantity, shape, configuration, or size to light any type of shape, symbol, wording, number, or other type of display.

The second display 216 comprises an area between the first and third layers 218 and 222 where the light-reducing medium of the second layer 220 is not entirely disposed to allow light to transmit through the portions of the second display 216 where the light-reducing medium is not disposed. Although in this embodiment the second display 216 comprises a telltale indicator comprising a lighting display, in the shape of a rectangle, indicating whether the function is turned on or off, in other embodiments the second display 216 may be formed in any quantity, shape, configuration, or size to light any type of shape, symbol, wording, number, or other type of display. Because the first display 214 and the second display 216 are disposed within the second layer 220, neither the first display 214 nor the second display 216 protrude outside of the first layer 218 providing for a perfectly flush, linear, aesthetically-pleasing, exterior first layer 218 disposed in one plane at locations over the first and second displays 214 and 216.

The third layer 222 comprises a light-transmitting member for transmitting light within the third layer 222. The third layer 222 comprises an injection molded clear plastic made of polycarbonate. In other embodiments, the third layer 222 may comprise a variety of light-transmitting members made of varying materials. After the second layer 220 is printed on the first layer 218, the first layer 218 is placed into a molding tool with the printed second layer 220 being disposed against transparent or translucent resin. The third layer 222 is then molded out of the transparent or translucent resin so that it is attached to the second layer 220 printed on the back-surface 218A of the first layer 218. In other embodiments, the first, second, and third layers 218, 220, and 222 may be formed or attached to one another using varying manufacturing methods.

Figure 5:
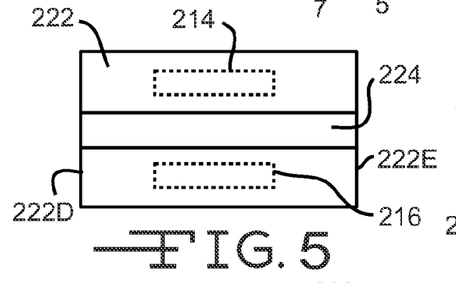
FIG. 5 illustrates a cross-sectional view through line 5-5 of the lighting apparatus of the embodiment of FIG. 4.

The first baffle 224 comprises a laser-formed light-reducing baffle disposed part-way through the third layer 222 extending linearly from an inner surface 222C of the third layer 222, disposed against the second baffle 226, to a front-surface 222B of the third layer 222 against the second layer 220 in-between the first and second displays 214 and 216. The first baffle 224 is disposed between the first and second light sources 232 and 234. FIG. 5 illustrates a cross-sectional view through line 5-5 of the lighting apparatus 210 of the embodiment of FIG. 4. As shown in FIG. 5, the first baffle 224 extends linearly from one end 222D of the third layer 222 to another end 222E of the third layer 222 in-between the first and second displays 214 and 216. In other embodiments, the first baffle 224 may be in varying numbers, types, shapes, sizes, configurations, locations, or orientations. The first baffle 224 is formed by applying a laser to darken and alter the properties of the materials of the third layer 222 from transparent or translucent to light-reducing for absorbing light. The first baffle 224 may be formed using varying types of lasers, using varying parameters for the laser wavelength, power, frequency, laser spot size, laser marking speed, laser line distance, total time, and for other laser parameters. One or more material additives may be added to the third layer 222 to assist in laser forming the first baffle 224. In other embodiments, the first baffle 224 may be manufactured in varying ways. In another embodiment, the first baffle 224 may comprise a plurality of baffles which are combined to reduce light from transmitting.

Figure 6:
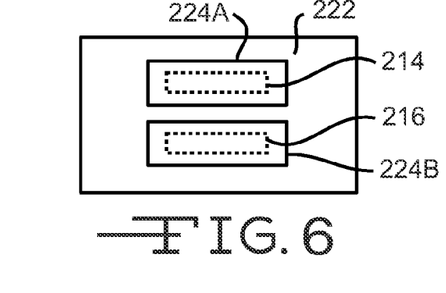
FIG. 6 illustrates an alternative cross-sectional view which may be used in another embodiment of a lighting apparatus.

FIG. 6 illustrates an alternative cross-sectional view which may be used in another embodiment of the third layer 222 in place of the first baffle 224. As shown in FIG. 6, in another embodiment light-reducing, laser-formed baffle 224A may be disposed in the third layer 222 to surround the first display 214 and light-reducing, laser-formed baffle 224B may be disposed in the third layer 222 to surround the second display 216. In other embodiments, any number, type, size, configuration, location, or orientation light-reducing baffles may be formed in the third layer 222 using varying types of manufacturing methods.

Figure 7:
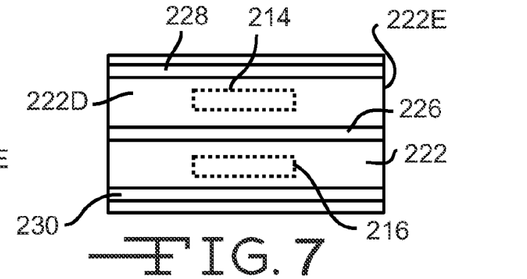
FIG. 7 illustrates a cross-sectional view through line 7-7 of the lighting apparatus of the embodiment of FIG. 4.

The second baffle 226 shown in FIG. 4 comprises a light-reducing baffle made of Acrylonitrile Butadiene Styrene (ABS) through a molding process. In other embodiments, the second baffle 226 may be made of varying light-reducing materials using a variety of manufacturing processes. The second baffle 226 is extends from the circuit board 236, between the first and second light sources 232 and 234, between first and second cavities 246 and 248, partially into the third layer 222 against the inner surface 222C of the third layer 222 and the first baffle 224 in-between the first and second displays 214 and 216. FIG. 7 illustrates a cross-sectional view through line 7-7 of the lighting apparatus 210 of the embodiment of FIG. 4. As shown in FIG. 7, the second baffle 226 extends linearly from one end 222D of the third layer 222 to another end 222E of the third layer 222 in-between the first and second displays 214 and 216. In another embodiment, the second baffle 226 may comprise a plurality of baffles which are combined to reduce light from transmitting. In other embodiments, the second baffle 226 may be in varying numbers, types, shapes, sizes, configurations, locations, or orientations.

The second baffle 226 shown in FIG. 4 is molded to the third layer 222. In other embodiments, the second baffle 226 may be attached to the third layer 222 using varied manufacturing methods. The first baffle 224 and the second baffle 226 combine to form a continuous light-reducing barrier to substantially prevent the first and second lights 242 and 244 emitted from respective first and second light sources 232 and 234 from combining. The first and second baffles 224 and 226 collectively extend from the circuit board 236, between the first and second light sources 232 and 234, between the first and second cavities 246 and 248, through the third layer 222, to the second layer 220 in-between the first and second displays 214 and 216.

The third baffle 228 comprises a light-reducing baffle made of Acrylonitrile Butadiene Styrene (ABS) through a molding process. In other embodiments, the third baffle 228 may be made of varying light-reducing materials using a variety of manufacturing processes. The third baffle 228 is disposed apart from the second baffle 226 to form the first cavity 246 which is aligned with the first display 214. The third baffle 228 extends from the circuit board 236 partially into the third layer 222 against the inner surface 222F of the third layer 222. As shown in FIG. 7, the third baffle 228 extends linearly from one end 222D of the third layer 222 to another end 222E of the third layer 222. In other embodiments, the third baffle 228 may be in varying numbers, types, shapes, sizes, configurations, locations, or orientations. The third baffle 228 is molded to the third layer 222 shown in FIG. 4. In other embodiments, the third baffle 228 may be attached to the third layer 222 using varied manufacturing methods. In still another embodiment, the third baffle 228 may comprise a plurality of baffles which are combined to reduce light from transmitting.

The fourth baffle 230 shown in FIG. 4 comprises a light-reducing baffle made of Acrylonitrile Butadiene Styrene (ABS) through a molding process. In other embodiments, the fourth baffle 230 may be made of varying light-reducing materials using a variety of manufacturing processes. The fourth baffle 230 is disposed apart from the second baffle 226 to form the second cavity 248 which is aligned with the second display 216. The fourth baffle 230 extends from the circuit board 236 partially into the third layer 222 against the inner surface 222G of the third layer 222. As shown in FIG. 7, the fourth baffle 230 extends linearly from one end 222D of the third layer 222 to another end 222E of the third layer 222. In other embodiments, the fourth baffle 230 may be in varying numbers, types, shapes, sizes, configurations, locations, or orientations. The fourth baffle 230 is molded to the third layer 222 shown in FIG. 4. In other embodiments, the fourth baffle 230 may be attached to the third layer 222 using varied manufacturing methods. In still another embodiment, the fourth baffle 230 may comprise a plurality of baffles which are combined to reduce light from transmitting.

Figure 8:
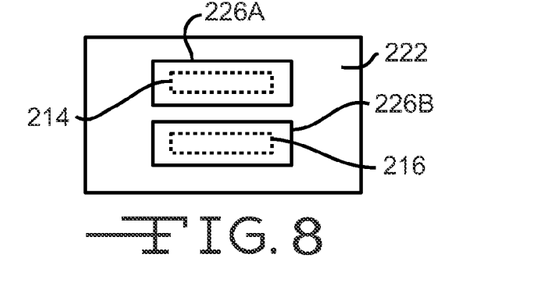
FIG. 8 illustrates an alternative cross-sectional view which may be used in another embodiment of a lighting apparatus.

FIG. 8 illustrates an alternative cross-sectional view which may be used in another embodiment of the third layer 222 in place of the second, third, and fourth baffles 226, 228, and 230. As shown in FIG. 8, in another embodiment light-reducing baffle 226A may be disposed in the third layer 222 to surround the first display 214 and light-reducing baffle 226B may be disposed in the third layer 222 to surround the second display 216. In other embodiments, any number, type, size, configuration, location, or orientation light-reducing baffles may be formed in the third layer 222 using varying types of manufacturing methods.

The first light source 232 shown in FIG. 4 is attached to the circuit board 236 and disposed in the first cavity 246 between the second and third baffles 226 and 228. The first light source 232 emits the first light 242 for lighting up the first display 214. The second light source 234 is attached to the circuit board 236 and disposed in the second cavity 248 between the second and fourth baffles 226 and 230. The second light source 234 emits the second light 244 for lighting up the second display 216. The first and second lights 242 and 244 emitted from the first and second light sources 232 and 234 are of different colors to light up the first and second displays 214 and 216 using varied colors. In other embodiments, the first and second light sources 232 and 234 may emit first and second lights 242 and 244 having varying properties.

The circuit board 236 controls when the first and second light sources 232 and 234 are powered on and off to control when the respective first and second lights 242 and 244 are emitted. The circuit board 236 further controls the power of the first and second light 242 and 244 emitted from the first and second respective light sources 232 and 234.

The first, second, and third light-reducing baffles 224, 226, and 228 substantially prevent the first light 242 emitted from the first light source 232 from combining with the second light 244 emitted from the second light source 234. In use, at the control of the circuit board 236, the first light 242 transmits from the first light source 232, through the first cavity 246 along a first pathway 242A between the second and third light-reducing baffles 226 and 228, into the third layer 222 along and between the first, second, and third light-reducing baffles 224, 226, and 228, through the first display 214 in the light-reducing second layer 220, through the first layer 218. Similarly, at the control of the circuit board 236, the second light 244 transmits from the second light source 234, through the second cavity 248 along a second pathway 244A between the second and fourth light-reducing baffles 226 and 230, into the third layer 222 along and between the first, second, and fourth light-reducing baffles 224, 226, and 230, through the second display 216 in the light-reducing second layer 220, through the first layer 218. The first and second baffles 224 and 226 substantially prevent the first and second lights 242 and 244 from crossing-over the respective opposite sides 227A and 227B of the first and second baffles 224 and 226 and combining. In such manner, the first display 214 is lit only by the first light 242 emitted from the first light source 232, and the second display 216 is lit only by the second light 244 emitted from the second light source 234. As a result, the first display 214 is lit in the color of the first light 242 and the second display 216 is lit in the color of the second light 244 without interference from one another.

In other embodiments, the first baffle 224 may extend completely through the third layer 222 from a back-surface 222A to the front-surface 222B, and the second, third, and fourth baffles 226, 228, and 230 may end at the back-surface 222A of the third layer 222. In still other embodiments, the first layer 218 may not be present at all. In further embodiments, any of the components of the lighting apparatus 210 discussed herein may be removed, modified in shape, size, configuration, location, quantity, material, or orientation, or one or more additional components may be added.

Figure 9:
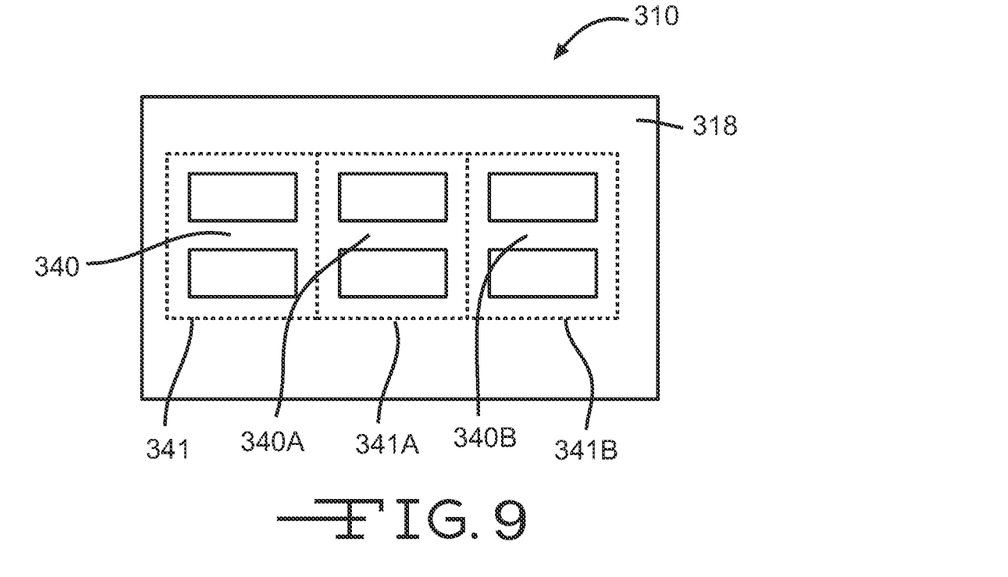
FIG. 9 illustrates a front view of another embodiment of a lighting apparatus of a vehicle.

FIG. 9 illustrates a front view of another embodiment of a lighting apparatus 310 of a vehicle. The lighting apparatus 310 comprises first, second, and third panel zone lighting displays 340, 340A, and 340B, also referred to as selective lighting, disposed in a first layer 318. The first, second, and third panel zone lighting displays 340, 340A, and 340B comprise displays, such as rectangular shapes, where a light-reducing second layer (not shown) attached below the first layer 318 is not disposed to allow light from light sources (not shown) to light up their corresponding displays as previously discussed within the instant disclosure. The first layer 318 is made of a light transmitting material such as Polycarbonate. In other embodiments, the first layer 318 may be made of varying light transmitting materials. The first panel zone lighting display 340 comprises backlit switch graphics such as audio functions or other types of backlit switch graphics. A first baffle 341 is disposed within the first layer 318 around a perimeter of the first zone lighting display 340. The second panel zone lighting display 340A comprises backlit switch graphics such as navigation functions or other types of backlit switch graphics. A second baffle 341A is disposed within the first layer 318 around a perimeter of the second zone lighting display 340A. The third panel zone lighting display 340B comprises backlit switch graphics such as climate control or other types of backlit switch graphics. A third baffle 341B is disposed within the first layer 318 around a perimeter of the third zone lighting display 340B.

The first, second, and third baffles 341, 341A, and 341B comprise laser-formed light-reducing baffles which isolate each of their respective first, second, and third panel zone lighting displays 340, 340A, and 340B so that only the intended zone is lit by its corresponding light source (not shown) without light-bleed from the other light sources. In such manner, each of the first, second, and third panel zone lighting displays 340, 340A, and 340B can be independently lit without the other zones being visible in a selective lighting usage. In another embodiment, any of the first, second, and third baffles 341, 341A, and 341B may comprise a plurality of baffles which are combined to reduce light from transmitting. In other embodiments, any number, type, configuration, orientation, size, shape, and location of panel zone lighting displays or baffles may be provided or manufactured in the first layer 318 using varying materials or manufacturing methods.

Figure 10:
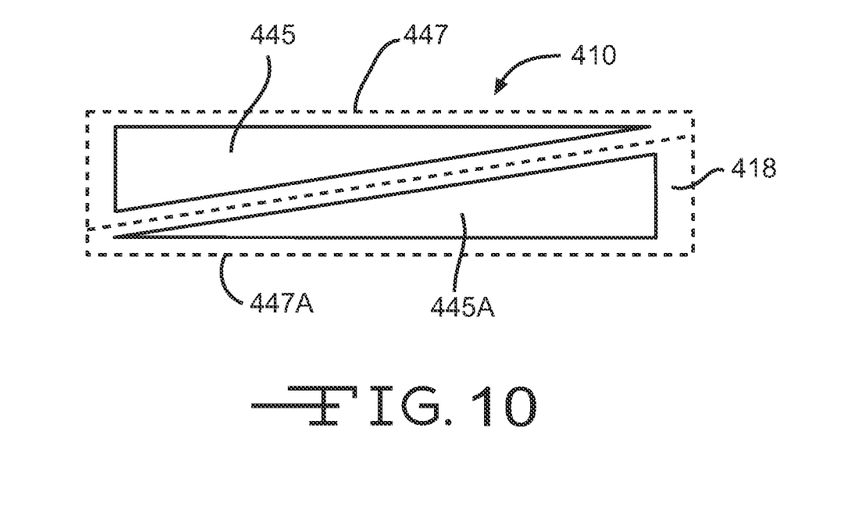
FIG. 10 illustrates a front view of another embodiment of a lighting apparatus of a vehicle.

FIG. 10 illustrates a front view of another embodiment of a lighting apparatus 410 of a vehicle. The lighting apparatus 410 comprises first and second backlit displays 445 and 445A disposed in a first layer 418. The first and second backlit displays 445 and 445A comprises displays, such as triangular shapes, where a light-reducing second layer (not shown) attached below the first layer 418 is not disposed to allow light from separate, discrete, narrow bandwidth light sources emitting varying color lights (not shown) to light up their corresponding displays as previously discussed within the instant disclosure. The first layer 418 is made of a light transmitting material such as Polycarbonate. In other embodiments, the first layer 418 may be made of varying light transmitting materials. The first backlit display 445 comprises a climate-control display to be lit by a blue light emitted by one light-source to signify cold temperatures. A first baffle 447 is disposed within the first layer 418 around a perimeter of the first backlit display 445. The second backlit display 445A comprises a climate-control display to be lit by a red light emitted by another light-source to signify hot temperatures. A second baffle 447A is disposed within the first layer 418 around a perimeter of the second backlit display 445A. In other embodiments, the first and second backlit displays 445 and 445A may signify varying types of displays to be lit by varying colors.

The first and second baffles 447 and 447A comprise laser-formed light-reducing baffles which isolate each of their respective first and second backlit displays 445 and 445A so that only the intended backlit display is lit by its own corresponding colored light source (not shown) without light-bleed from the other differently colored light sources. In such manner, each of the first and second backlit displays 445 and 445A can be independently lit in its own independent light-color without interference from the light-color of the other backlit display. This is more cost-efficient and forms a purer light-source color that is more aesthetically-pleasing than filtering broadband light-sources such as white LED's as typically used. In another embodiment, any of the first and second baffles 447 and 447A may comprise a plurality of baffles which are combined to reduce light from transmitting. In other embodiments, any number, type, configuration, orientation, size, shape, and location of backlit displays or baffles may be provided or manufactured in the first layer 418 using varying materials or manufacturing methods.

One or more embodiments of the disclosure allows for one or more issues present in one or more of the current lighting apparatus or methods of manufacture to be overcome. For instance, one or more embodiments of the disclosure provide for a telltale indicator and a graphic display to be disposed within a lighting apparatus with the exterior surface being linear, flush, and aesthetically pleasing due to being disposed in one plane at locations over the first and second displays. Moreover, one or more embodiments of the disclosure provide for a telltale indicator and a graphic display which do not show margin gaps and which substantially prevent light-leaks between the separate lights of the telltale indicator and the graphic display, allowing each to be lit in their own color without interference. Furthermore, one or more embodiments of the disclosure allow for the use of a one-shot optical light-transmitting member due to the laser-formed, light-reducing darkening of the material of the light-transmitting member that would otherwise couple light to the telltale indicator and graphic display.

It should be understood, of course, that the foregoing relates to exemplary embodiments of the disclosure and that modifications may be made without departing from the spirit and scope of the disclosure as set forth in the following claims.

I claim:

1. A lighting apparatus comprising:
   a light-transmitting member for transmitting light within the light-transmitting member;
   a first light source for emitting a first light into the light-transmitting member;
   a second light source for emitting a second light into the light-transmitting member;
   and at least one light-reducing baffle disposed in-between the first and second light sources, the at least one light-reducing baffle extending continuously, individually or collectively, from a first end of the first and the second light sources, through a second end opposite the first end, and through the light-transmitting member thereby preventing the first light and the second light from combining or interfering with one another both before reaching the light-transmitting member and within the light-transmitting member.

2. The lighting apparatus of claim 1 wherein the first and second light sources are configured to emit the respective first and second lights in different colors.

3. The lighting apparatus of claim 1 wherein the at least one light-reducing baffle is entirely disposed perpendicularly to the light-transmitting member.

4. The lighting apparatus of claim 1 wherein the at least one light-reducing baffle is only disposed in one plane.

5. The lighting apparatus of claim 1 wherein the lighting apparatus comprises a vehicle lighting apparatus.

6. The lighting apparatus of claim 5 further comprising a graphic display which is configured to be lit by the first light emitted from the first light source, and a telltale indicator which is configured to be lit by the second light emitted from the second light source.

7. The lighting apparatus of claim 6 wherein the graphic display comprises at least one symbol configured to indicate a function the graphic display turns on and off, and the telltale indicator is configured to indicate whether the function is turned on or off.

8. The lighting apparatus of claim 6 further comprising an exterior layer disposed over the graphic display and the telltale indicator with the exterior layer being disposed linearly in one plane at locations directly over the graphic display and the telltale indicator.

9. The lighting apparatus of claim 6 further comprising a light-reducing medium disposed against the light-transmitting member, wherein the graphic display and the telltale indicator are disposed in the light-reducing medium.

10. A method of manufacturing a lighting apparatus comprising:
    forming a first light-reducing baffle in a light-transmitting member of a lighting apparatus;
    disposing a first light source so that it is positioned to transmit a first light into the light-transmitting member of the lighting apparatus;
    disposing a second light source so that it is positioned to transmit a second light into the light-transmitting member of the lighting apparatus;
    disposing a second light-reducing baffle against the first light-reducing baffle with the first and second light-reducing baffles disposed between the first and second light sources, and collectively extending continuously from a first end of the first and the second light sources, through a second end opposite the first end, through the light-transmitting member so that the first and second light-reducing baffles prevent the first light and the second light from combining or interfering with one another both before reaching the light-transmitting member and within the light-transmitting member.

11. The method of claim 10 wherein the forming the first light-reducing baffle in the light-transmitting member of the lighting apparatus comprises laser-forming the first light-reducing baffle in the light-transmitting member of the lighting apparatus.

12. The method of claim 10 further comprising molding the second baffle to the light-transmitting member.

13. The method of claim 10 wherein the disposing the second light-reducing baffle against the first light-reducing baffle further comprises disposing both the first and the second light-reducing baffles in only one plane.

14. The method of claim 13 wherein the disposing the second light-reducing baffle against the first light-reducing baffle further comprises disposing both the first and the second light-reducing baffles perpendicularly to the light-transmitting member.

15. The method of claim 10 further comprising disposing a third baffle against the light-transmitting member to dispose the first light source in-between the second and third baffles.

16. The method of claim 15 further comprising molding the third baffle to the light-transmitting member to dispose the first light source in-between the second and third baffles.

17. The method of claim 15 further comprising disposing a fourth baffle against the light-transmitting member to dispose the second light source in-between the second and fourth baffles.

18. The method of claim 17 further comprising molding the fourth baffle to the light-transmitting member to dispose the second light source in-between the second and fourth baffles.

19. The method of claim 10 further comprising disposing a graphic display so that it is configured to be lit by the first light emitted from the first light source into the light-transmitting member, and disposing a telltale indicator so that it is configured to be lit by the second light emitted from the second light source into the light-transmitting member.

20. The method of claim 19 further comprising disposing a light-reducing medium against the light-transmitting member with the graphic display and the telltale indicator being disposed in the light-reducing medium.

21. The method of claim 20 further comprising disposing the light-reducing medium in-between the light-transmitting member and a second light-transmitting member.

22. The method of claim 21 wherein the second light-transmitting member comprises a film, and further comprising molding the light-transmitting member.

23. The method of claim 21 further comprising printing the light-reducing medium on the second light-transmitting member.

\* \* \* \* \*